(12) United States Patent
Neuerburg (10) Patent No.: US 6,305,153 B1
(45) Date of Patent: Oct. 23, 2001

(54) CUTTING MEMBER FOR AGRICULTURAL MOWER

(75) Inventor: Horst Neuerburg, Saverne (FR)

(73) Assignee: Kuhn S.A., Saverne (FR)

( * ) Notice: Subject to any disclaimer, the term of this patent is extended or adjusted under 35 U.S.C. 154(b) by 0 days.

(21) Appl. No.: 09/498,373

(22) Filed: Feb. 4, 2000

(30) Foreign Application Priority Data

Feb. 15, 1999 (FR) .................................................. 99 01899

(51) Int. Cl.[7] .................................................. A01D 34/03
(52) U.S. Cl. .............................................. 56/13.6; 56/295
(58) Field of Search ........................... 56/295, 13.6, 192, 56/6, 7, 320.1, 255, DIG. 6, DIG. 10, 16.4 R (56) References Cited

U.S. PATENT DOCUMENTS

| | | |
|---|---|---|
| 3,469,378 | * 9/1969 | Heesters et al. .................. 56/11.9 |
| 4,343,138 | 8/1982 | Neuerburg . |
| 4,426,828 | 1/1984 | Neuerburg . |
| 4,443,998 | 4/1984 | Neuerburg . |
| 4,452,034 | 6/1984 | Neuerburg . |

(List continued on next page.)

FOREIGN PATENT DOCUMENTS

| | | |
|---|---|---|
| 2 072 365 | 9/1971 | (FR) . |
| 2 517 927 | 6/1983 | (FR) . |
| 2 561 488 | 9/1985 | (FR) . |
| 2 319 454 | 5/1998 | (GB) . |

Primary Examiner—Robert E. Pezzuto
Assistant Examiner—Árpád Fábián Kovács
(74) Attorney, Agent, or Firm—Oblon, Spivak, McClelland, Maier & Neustadt, P.C.

(57) ABSTRACT

A cutting member of a cutting machine driven in rotation about an upwardly directed axis of revolution. The cutting member comprises at least two supports each carrying a cutting element, and at least two active areas each located in a region of a corresponding cutting element. The active areas are exposed, during the work, to a product cut previously by the cutting elements, and they are contributing to the conveying of the cut product. Each support includes an upper part which forms at least a corresponding active area.

14 Claims, 5 Drawing Sheets

U.S. PATENT DOCUMENTS

| | | | |
|---|---|---|---|
| 4,466,234 | * | 8/1984 | Sasaki .................................. 56/13.6 |
| 4,531,349 | * | 7/1985 | Ehrhart et al. ........................ 56/13.6 |
| 4,549,390 | * | 10/1985 | McLean ............................... 56/13.6 |
| 4,610,128 | | 9/1986 | Ermacora . |
| 4,669,256 | | 6/1987 | Ermacora et al. . |
| 4,694,640 | | 9/1987 | Ermacora et al. . |
| 4,714,123 | | 12/1987 | Ermacora et al. . |
| 4,719,742 | | 1/1988 | Ermacora et al. . |
| 4,720,964 | | 1/1988 | Ermacora et al. . |
| 4,723,396 | | 2/1988 | Ermacora . |
| 4,763,463 | | 8/1988 | Ermacora et al. . |
| 4,771,591 | | 9/1988 | Ermacora . |
| 4,809,488 | | 3/1989 | Neuerburg et al. . |
| 4,811,553 | | 3/1989 | Ermacora et al. . |
| 4,815,264 | * | 3/1989 | Mijnders ............................... 56/295 |
| 4,833,868 | | 5/1989 | Ermacora et al. . |
| 4,848,069 | | 7/1989 | Ermacora et al. . |
| 4,879,870 | | 11/1989 | Neuerburg . |
| 4,896,493 | | 1/1990 | Neuerburg . |
| 4,922,693 | | 5/1990 | Neuerburg . |
| 4,947,629 | | 8/1990 | Ermacora et al. . |
| 4,955,187 | * | 9/1990 | Van Der Lely ...................... 56/13.6 |
| 4,970,848 | | 11/1990 | Neuerburg et al. . |
| 4,986,064 | | 1/1991 | Ermacora . |
| 4,991,383 | | 2/1991 | Ermacora . |
| 4,999,981 | | 3/1991 | Neuerburg . |
| 5,060,462 | | 10/1991 | Helfer et al. . |
| 5,094,063 | | 3/1992 | Wattron et al. . |
| 5,107,663 | | 4/1992 | Wattron et al. . |
| 5,136,828 | | 8/1992 | Ermacora . |
| 5,199,249 | | 4/1993 | Wattron et al. . |
| 5,199,250 | | 4/1993 | Ermacora et al. . |
| 5,357,737 | | 10/1994 | Ermacora et al. . |
| 5,417,042 | | 5/1995 | Walch et al. . |
| 5,421,145 | * | 6/1995 | Pruitt et al. ............................... 56/6 |
| 5,423,165 | | 6/1995 | Walch et al. . |
| 5,507,136 | | 4/1996 | Walch . |
| 5,522,208 | | 6/1996 | Wattron . |
| 5,566,537 | | 10/1996 | Kieffer et al. . |
| 5,660,032 | | 8/1997 | Neuerburg et al. . |
| 5,715,663 | | 2/1998 | Getz . |
| 5,727,371 | | 3/1998 | Kieffer et al. . |
| 5,749,390 | | 5/1998 | Ermacora et al. . |
| 5,784,866 | * | 7/1998 | Campbell et al. ......................... 56/6 |
| 5,794,424 | | 8/1998 | Ermacora et al. . |
| 5,845,468 | | 12/1998 | Richardson et al. . |
| 5,852,921 | | 12/1998 | Neuerburg et al. . |
| 5,857,314 | | 1/1999 | Wolff . |
| 5,901,533 | | 5/1999 | Ermacora et al. . |
| 5,901,537 | | 5/1999 | Walch et al. . |
| 5,966,913 | | 10/1999 | Neuerburg . |
| 5,992,133 | | 11/1999 | Walch et al. . |
| 6,003,291 | | 12/1999 | Ermacora et al. . |

* cited by examiner

Fig. 5

CUTTING MEMBER FOR AGRICULTURAL MOWER

CROSS-REFERENCE TO RELATED APPLICATIONS

This application is related to and claims priority, under 35 U.S.C. §119, from French Patent Application No. 99 01899, filed on Feb. 15, 1999, the entire contents of which are hereby incorporated by reference herein.

BACKGROUND OF THE INVENTION

1. Field of the Invention

The present invention relates to a cutting member of a cutting machine intended to be driven in rotation about an upwardly directed axis of revolution and including:

- at least two supports each intended to carry a cutting element, and
- at least two active areas each located in the region of a corresponding cutting element and each exposed, during the work, to the product previously cut by said cutting elements, each active area contributing to the conveying of said cut product.

2. Discussion of the Background

Such a cutting member with which a cutting machine (KUHN FC 250-FC 300 mower-conditioners) is fitted is known from the prior art.

This known machine includes a cutting mechanism provided with a plurality of cutting members. The cutting mechanism is moved, during the work (i.e., a cutting operation), in a direction of advance and is intended to cut a standing product down to the ground. To do this, the cutting members, arranged side by side along a line transverse to the direction of advance, are driven in rotation, during the work, about a respective upwardly directed axis of rotation. Each cutting member is formed from a stamped sheet and includes two supports, each carrying a cutting element.

Each cutting member additionally includes two active areas, wherein each of the active areas is located in the region of a corresponding cutting element and each of the active areas is exposed, during the work, to the product previously cut by the cutting elements. Each active area extends, over part of the bent sheet and of the corresponding support, and contributes to the conveying of the cut product toward the rear of the cutting mechanism. During the work, repeated contact with the cut product causes the cutting members to undergo a certain amount of wear, especially in the active areas. When the cutting members have undergone a certain degree of wear, they have to be replaced with new cutting members.

SUMMARY OF THE INVENTION

The object of the present invention is to improve these known cutting members by increasing their lifetime while seeking to obtain a simple and inexpensive solution.

To do this, the cutting member is one wherein each support includes an upper part, forming at least the corresponding active area. Such a design makes it possible to increase the lifetime of the cutting member. This is because the active area is now formed exclusively by the corresponding support, which support has characteristics from those of the rest of the cutting member.

The present invention also relates to the following characteristics, taken in isolation or in any of their technically possible combinations:

- each upper part of a support includes a convex upper surface;
- the cutting member includes a first part by means of which it is fastened to a shaft of longitudinal axis coincident with the axis of revolution, and a second part of elongate shape which includes, on one side, a first end near which a first support is located and, on the other side, a second end near which a second support is located;
- the second part of the cutting member is of approximately oval or elliptical shape;
- the second part of the cutting member includes, on one side, a first cut located at the first end and, on the other side, a second cut located at the second end, each support being housed in the corresponding cut;
- each support forms to a large extent the corresponding end of the second part;
- the second part includes, at each end, an upper surface which extends substantially in the continuation of the upper part of the corresponding support has, thereby making it possible to reduce the wear of the support;
- each support has a thickness greater than the thickness of the second part, thereby advantageously making it possible to increase the lifetime of the cutting member;
- each support includes a corresponding lower part which extends below the second part of the cutting member;
- the lower part of each support includes a reinforcing lug which extends toward the first part, thereby advantageously making it possible to stiffen the cutting member;
- the lower part of each support extends beyond the limits of the upper part of said support;
- the lower part of each support partially follows the shape of the second part, thereby also making it possible to stiffen the cutting member;
- each support forms an attached support which is fastened to the second part by welding;
- each support forms an attached support which is fastened to the second part in a removable manner, thereby advantageously making it possible to replace it when it is worn;
- each support includes a hole allowing the corresponding cutting element to be linked thereto.

The present invention also relates to a cutting machine, intended to be coupled to a motor vehicle, and comprising a cutting mechanism provided with at least one cutting member driven in rotation about an upwardly directed axis of revolution, the cutting member or members having one or more of the above characteristics.

BRIEF DESCRIPTION OF THE DRAWINGS

Further objects, characteristics, and advantages of the present invention will appear in the following description, with reference to the appended drawings, which represent, by way of non-limiting examples, a few embodiments of the cutting member.

In these drawings.

DESCRIPTION OF THE PREFERRED EMBODIMENTS

Figure 1:
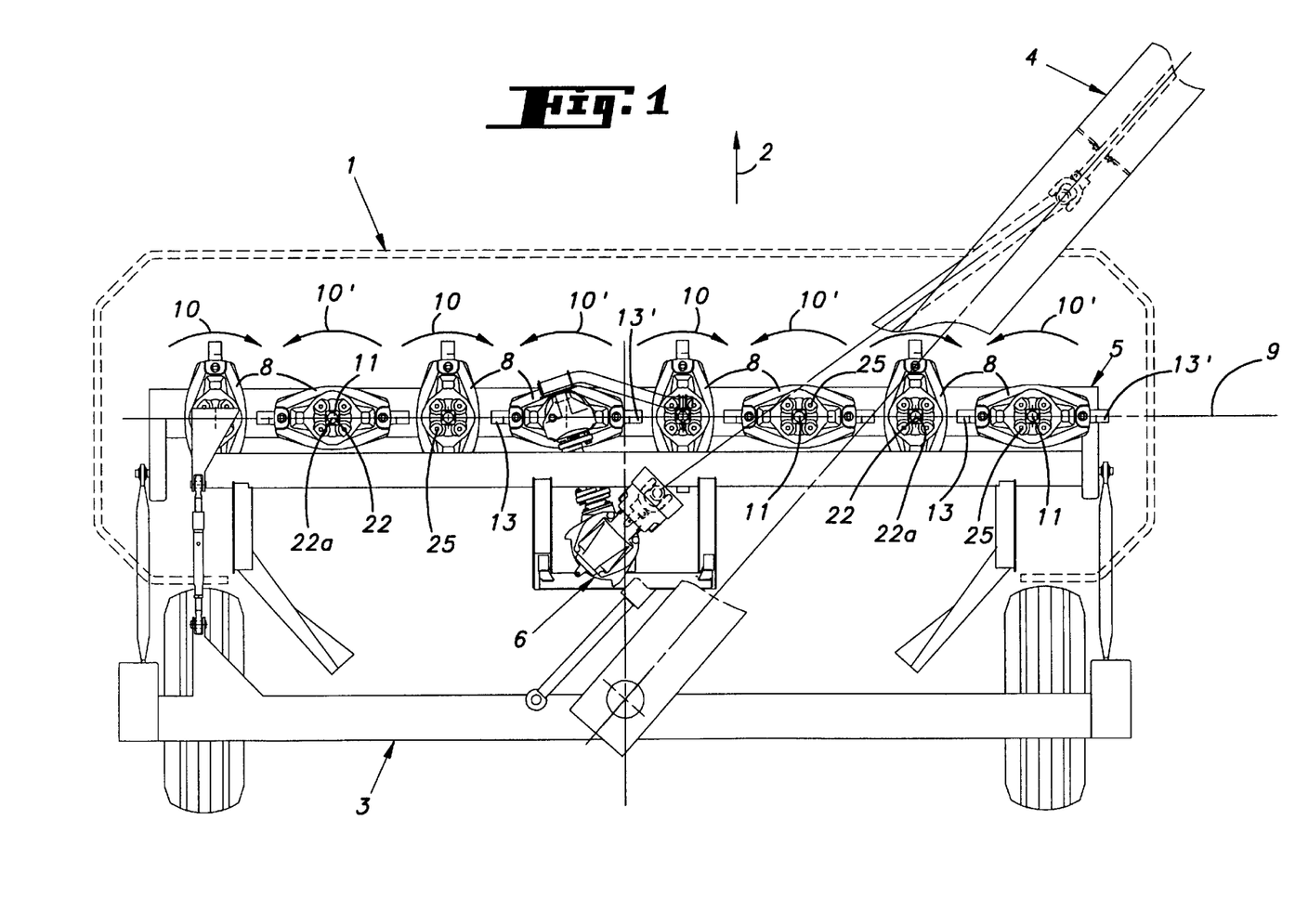
FIG. 1 shows a top view of a cutting machine on which a few partial cutaways have been made.
Figure 2:
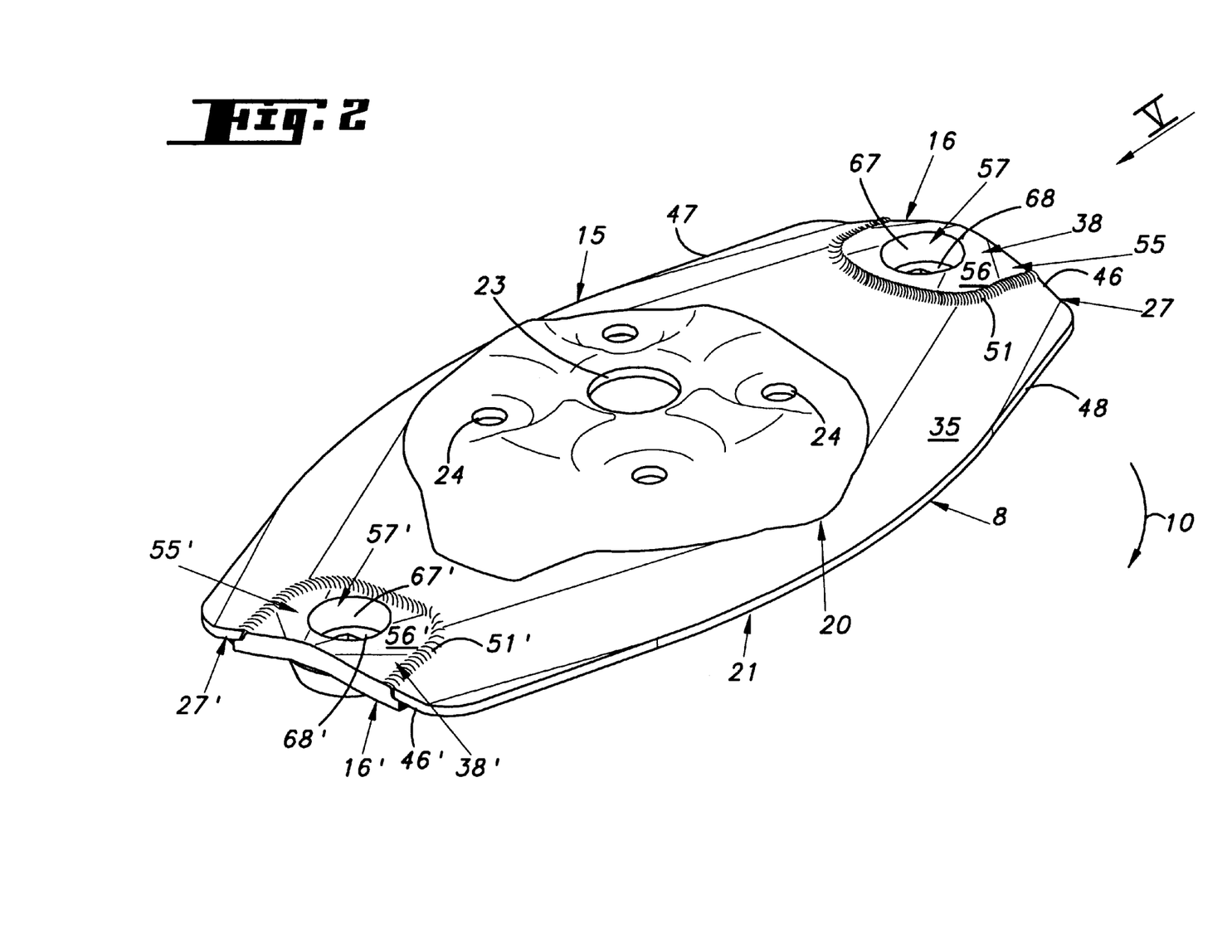
FIG. 2 shows a perspective view of just a cutting member with which the cutting machine in FIG. 1 is equipped, on another scale, according to a first embodiment.

The cutting machine 1 shown in FIG. 1 is, according to the illustrative embodiment shown, a mower 1 of the trailed type, intended to be hitched to a motor vehicle (not shown) which, during use, pulls it in the direction of advance 2.

This mower 1 basically comprises a movable frame 3, a drawbar 4, a cutting mechanism 5 and transmission members 6.

The movable frame 3 is linked, on one side, to the cutting mechanism 5 and, on the other side, to the drawbar 4. The drawbar 4 allows the mower 1 to be coupled to the motor vehicle by virtue of a hitching structure (not shown).

The cutting mechanism 5, driven by means of the transmission members 6, includes a plurality of cutting members 8 arranged beside each other along a line 9 transverse to the direction of advance 2. Each cutting member 8 is driven in rotation in a respective direction 10, 10' about an approximately vertical axis of revolution 11.

FIG. 1 also shows that each cutting member 8 is equipped with two cutting elements 13, 13', intended to cut a standing product down to the ground when the cutting member 8 is driven in rotation.

Referring to FIGS. 2 to 5, each cutting member 8 is composed, according to this first illustrative embodiment shown, of a main structure 15 and of two supports 16, 16'. This cutting member 8 is also, according to this illustrative embodiment shown, at least approximately symmetrical with respect to a longitudinal plane of symmetry 17 and with respect to a transverse plane of symmetry 18.

It may be seen that the main structure 15 is composed, still according to the illustrative embodiment shown, of a sheet having a certain thickness and a certain number of bosses, concave parts, and plane parts, allowing, on the one hand, the main structure 15 to be stiffened and, on the other hand, the main structure 15 to be given a certain shape, intended for conveying the cut product in the opposite direction to the direction of advance 2. To do this, the main structure 15 includes a first part 20 and a second part 21. This first part 20 is intended to be fastened to a corresponding shaft 22 of longitudinal axis 22a, at least approximately coincident with the axis of revolution 11. The shaft 22 forms part of the cutting mechanism 5 and drives the corresponding cutting member 8 in rotation. For this purpose, the first part 20 includes, according to the illustrative embodiment shown, a central hole 23 and four peripheral holes 24. The central hole 23, of circular shape, is located at least approximately at the center of the main structure 15. This central hole 23 has a longitudinal axis 23a, at least approximately coincident with the intersection of the planes of symmetry 17, 18. This central hole 23 is also intended to receive a corresponding shaft 22, described above, and makes it possible to center the main structure 15, with respect to the shaft 22, so as to guarantee correct operation. As regards the four peripheral holes 24, these allow the main structure 15 and consequently, the cutting member 8, to be fastened to the corresponding shaft 11 by means of four screws 25. To do this, each screw 25 passes through the first part 20 of the main structure 15 and is screwed into the shaft 11. It will also be seen in FIG. 3 that a plane part is provided around each peripheral hole 24, thereby allowing the screws 25, described above, to bear properly.

According to this first embodiment shown, it will also be noted that the first part 20 of the main structure 15 has the shape of the frustum of a cone and extends upwardly. This first part 20 is also at least approximately concentric with the central hole 23, as may be seen in FIG. 3.

Figures 3, 4:
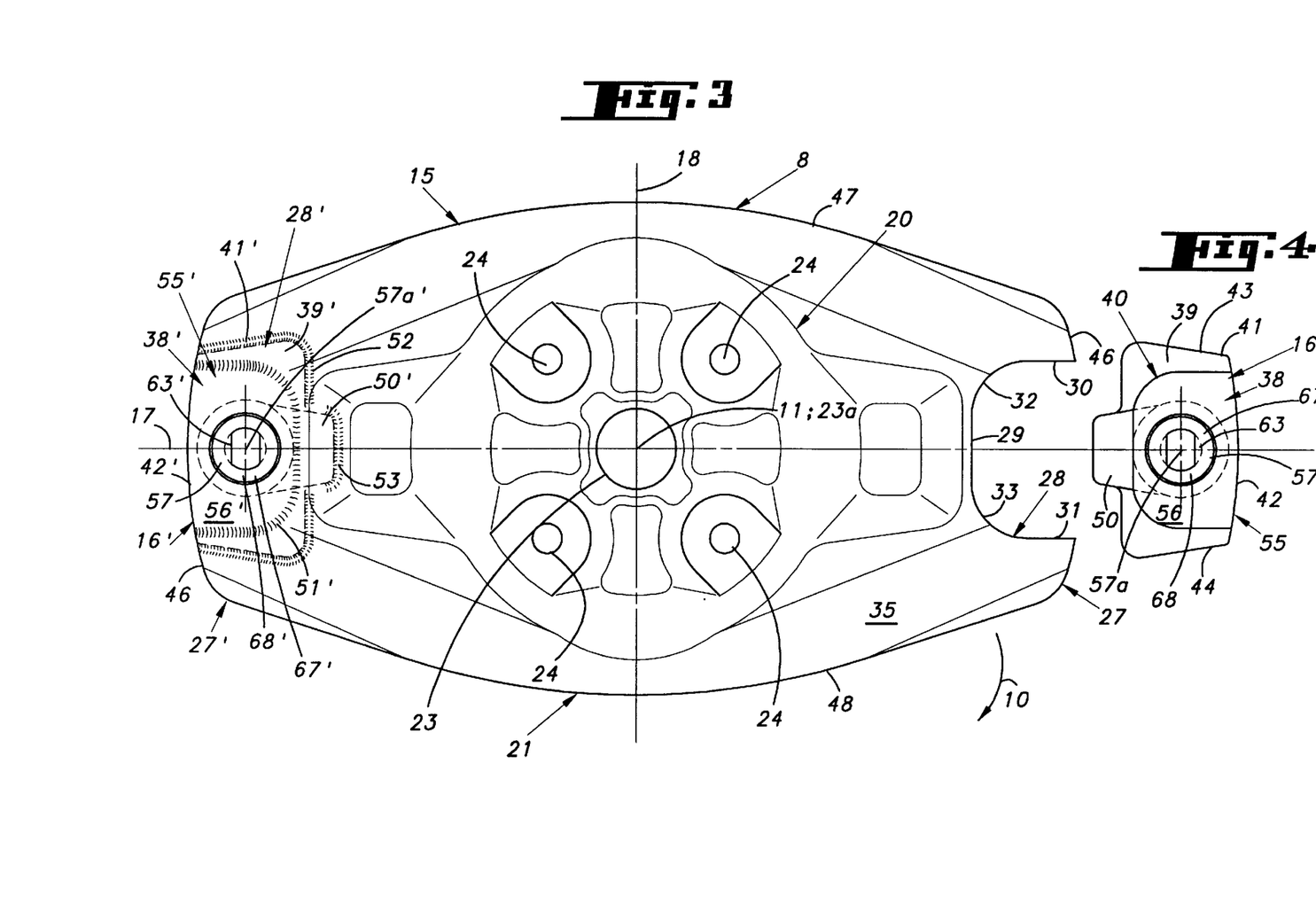
FIG. 3 shows a top view of part of the cutting member in FIG. 2, on another scale.
FIG. 4 shows a top view of just a support with which the cutting member in FIG. 3 is intended to be equipped.

As regards the second part 21, this is of elongate shape; more specifically, the second part 21 is of approximately oval or elliptical shape in the longitudinal plane of symmetry 17 and the transverse plane of symmetry 18.

This second part 21 includes a first end 27 located on either side of the longitudinal plane of symmetry 17, near which end there is provided a first cut 28 in which a first support 16 is housed.

As described previously, the second part 21 is symmetrical with respect to the transverse plane of symmetry 18. Consequently, the second part 21 also includes a second end 27' located on either side of the longitudinal plane of symmetry 17, near which end there is provided a second cut 28' in which a second support 16' is housed.

Given that the cutting member 8 is symmetrical with respect to the transverse plane of symmetry 18, the second cut 28' and the second support 16' are at least approximately identical to the first cut 28 and to the first support 16. This is why only the first cut 28 and the first support 16 will be described in greater detail.

In the rest of the description, the elements assigned a reference number followed by the "prime" exponent ' refer to the second cut 28' and to the second support 16'. These elements will be described in greater detail only if this proves to be necessary.

FIGS. 3 and 4 show the support 16 before it is housed in the first cut 28. The first cut 28 has a first side 29 approximately at right angles to the longitudinal plane of symmetry 17, a second side 30 and a third side 31. The second side 30 is contiguous with the first side 29 via a first rounded shape 32 and extends approximately parallel to the longitudinal plane of symmetry 17. As regards the third side 31, this is located facing the second side 30 with respect to the longitudinal plane of symmetry 17 and is contiguous with the first side 29 via a second rounded shape 33. This third side 31 also extends approximately parallel to the longitudinal plane of symmetry 17. The three sides 29, 30, 31 of this first cut 28 form a "U", the base of which consists of the first side 29 and the opening of which is directed toward the first end 27 of the second part 21 of said main structure 15.

Figure 5:
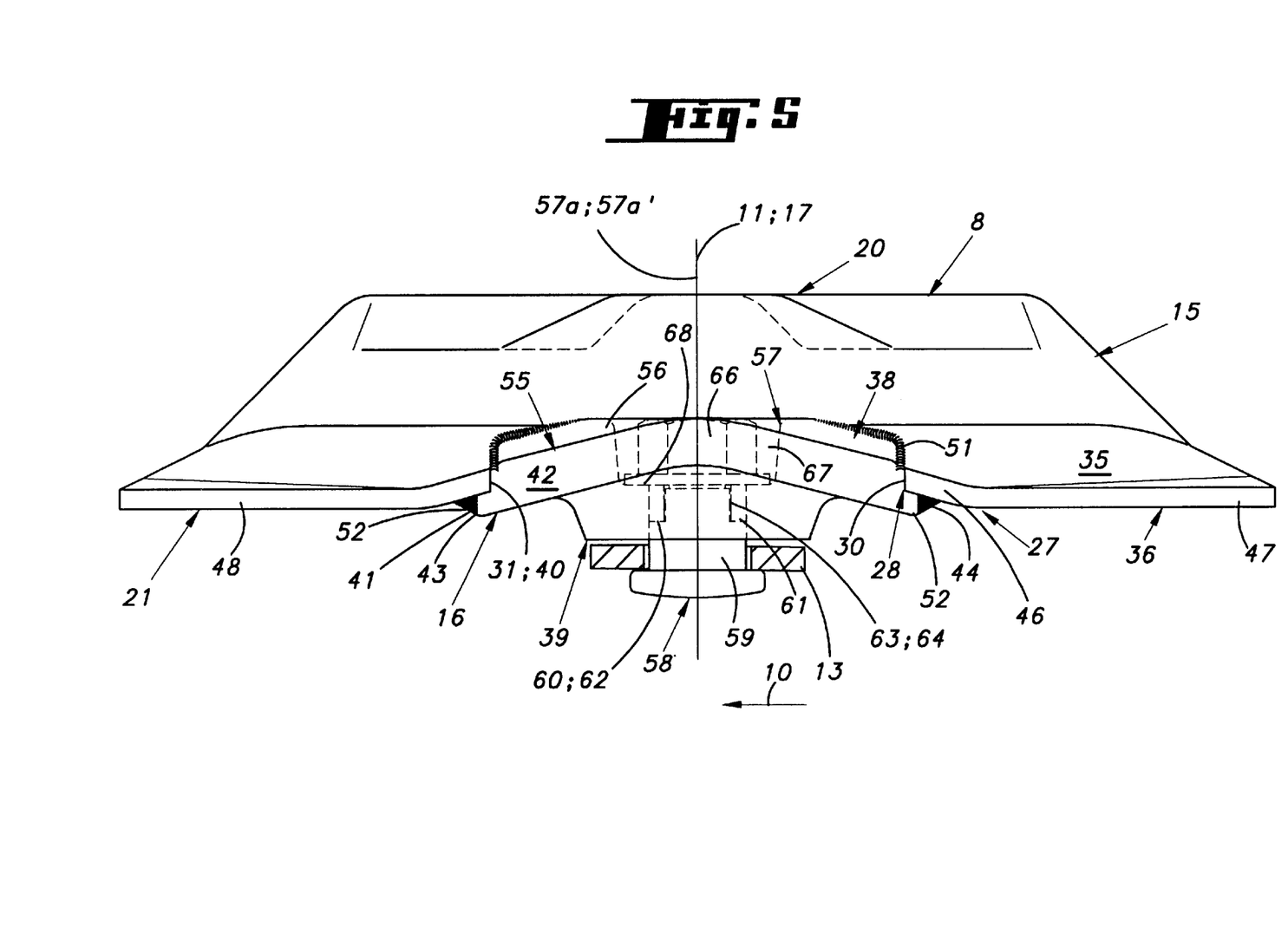
FIG. 5 shows, on another scale, a side view of the cutting member in the direction of the arrow V defined in FIG. 2, equipped with a cutting element.

The second part 21 of the main structure 15 of the cutting member 8 includes an upper surface 35 and a lower surface 36. FIG. 5 shows that the first end 27 of the second part 21 of the main structure 15 extends upward in the region of the second side 30 and of the third side 31 of the first cut 28.

The various figures also show that the first support 16 includes an upper part 38 and a lower part 39. In a top view, the upper part 38 is smaller than the lower part 39, and they are separated by an edge 40.

FIG. 4 shows that the lower part 39 of the support 16 extends beyond the limits of the upper part 38 of the support 16, these limits being defined by the edge 40, described above. Consequently, when the first support 16 is housed in the first cut 28, the lower part 39 of the first support 16 bears against the lower surface 36 of the second part 21 of the main structure 15 and the edge 40 bears, at least substantially, against the first cut 28. Thus, the upper part 38 of the support 16, delimited by the edge 40, also has a "U" shape, which at least approximately matches the first cut 28.

FIGS. 3 and 4 also show that when the support 16 is housed in the first cut 28, the lower part 39 of the support 16 partially follows the shape of the second part 21 of the main structure 15 of the cutting member 8. This is because the end 41 of the lower part 39 has three sides 42, 43, 44, which are at least approximately parallel to the three corresponding sides 46, 47, 48 of the second part 21 of the main structure 15.

Such a design of the cutting member 8 advantageously makes it possible to stiffen the latter.

FIG. 4 also shows that the lower part 39 of the support 16 includes a reinforcing lug 50, which is at least approximately symmetrical with respect to the longitudinal plane of symmetry 17, and which is directed toward the first part 20 of the main structure 15 of the cutting member 8, when the support 16 is housed in the cut 28. This reinforcing lug 50 bears on the lower surface 36 of the second part 21 of the main structure 15.

Each support 16, 16' therefore forms a piece attached to the main structure 15. To do this, according to this first illustrative embodiment shown, each support 16, 16' is fastened to the second part 21 of the main structure 15 of the cutting member 8 by welding. In fact, FIG. 3 shows that the support 16' is fastened to the second part 21 by means of:

an upper weld bead 51' which straddles the edge 40' and the second cut 28';

a lower weld bead 52', extending over the end 41' of the lower part 39' of the support 16' and the lower surface 36 of the second part 21; and another weld bead 53', extending over the reinforcing lug 50' of the lower part 39' and the lower surface 36.

Of course, the support 16 is intended to be fastened to the second part 21 by means of a corresponding weld bead 51, 52, 53.

It should also be noted that the cutting member 8 includes, according to this first illustrative embodiment shown, two active areas 55, 55', each located in the region of a corresponding cutting element 13, 13' and each exposed, during the work, to the product previously cut by the cutting elements 13, 13'. Each active area 55, 55' contributes, when the cutting member 8 is driven in rotation about the longitudinal axis 22*a*, to the conveying of the cut product in the opposite direction to the direction of advance 2.

More specifically, each upper part 38, 38' of the corresponding support 16, 16' forms at least the corresponding active area 55, 55'. To do this, it should be noted in the various figures that each support 16, 16' forms to a large extent the corresponding end 27, 27' of the second part 21 of the main structure 15 of the cutting member 8. This is because FIGS. 3 and 5 show that the side 42, 42' of the end 41, 41' of the corresponding support 16, 16' is greater than the side 46, 46' of the main structure 15.

Each upper part 38, 38' of the corresponding support 16, 16' has a convex upper surface 56, 56' which advantageously allows it to contribute to the conveying of the cut product.

It will be noted in FIG. 5 that the upper surface 35 of the second part 21 of the main structure 15 extends at its corresponding end 27, 27' substantially in the extension of the upper surface 56, 56' of the corresponding support 16, 16'. Such continuity of the surfaces 35; 56, 56' of the main structure 15 and of the supports 16, 16' advantageously makes it possible for the supports 16, 16' to wear less and consequently allows the lifetime of the cutting member 8 to be increased.

As described previously, each support 16, 16' forms at least the corresponding active area 55, 55' and consequently, each support 16, 16' therefore forms a wear element. Consequently, each support 16, 16' advantageously has a thickness greater than the thickness of the second part 21 of the main structure 15, thereby making it possible to increase even further the lifetime of the supports 16, 16' and therefore, the lifetime of the cutting member 8.

Finally, it will also be noted that each support 16, 16' includes a hole 57, 57' of longitudinal axis 57*a*, 57'*a* at least approximately parallel to the longitudinal axis 23*a* of the central hole 23.

Each hole 57, 57' is intended to receive a screw 58 which supports the corresponding cutting element 13, 13'. For this purpose, it may be seen in FIG. 5, that the screw 58 extends upwardly in the hole 57 and that it includes a cylindrical guiding part 59 along which the cutting element 13 is guided. The screw 58 also includes a shoulder 60, which extends in a lower cavity 61 forming part of the hole 57 and which bears on a lower bearing surface 62, located at the bottom of the lower cavity 61.

This hole 57 also includes a profiled part 63, near which another, complementary profiled part 64, belonging to the screw 58, extends. These two profiled parts 63, 64 prevent any rotation of the screw 58 with respect to the support 16. Screwed onto the end of the screw 58 is a nut 66 which extends entirely in an upper cavity 67, provided in the support 16 and forming part of the hole 57. This nut 66 bears on an upper bearing surface 68 provided in the bottom of the upper cavity 67. It will also be noted that the upper cavity 67, the profiled part 63 of the hole 57, and the lower cavity 61 are at least approximately centered with respect to the longitudinal axis 57*a* of the hole 57.

The upper cavity 67 advantageously allows the nut 66 to be protected from the cut product, thereby preventing the nut from being damaged and no longer being able to be undone in order to change the cutting element 13 when the latter is worn.

Figure 6:
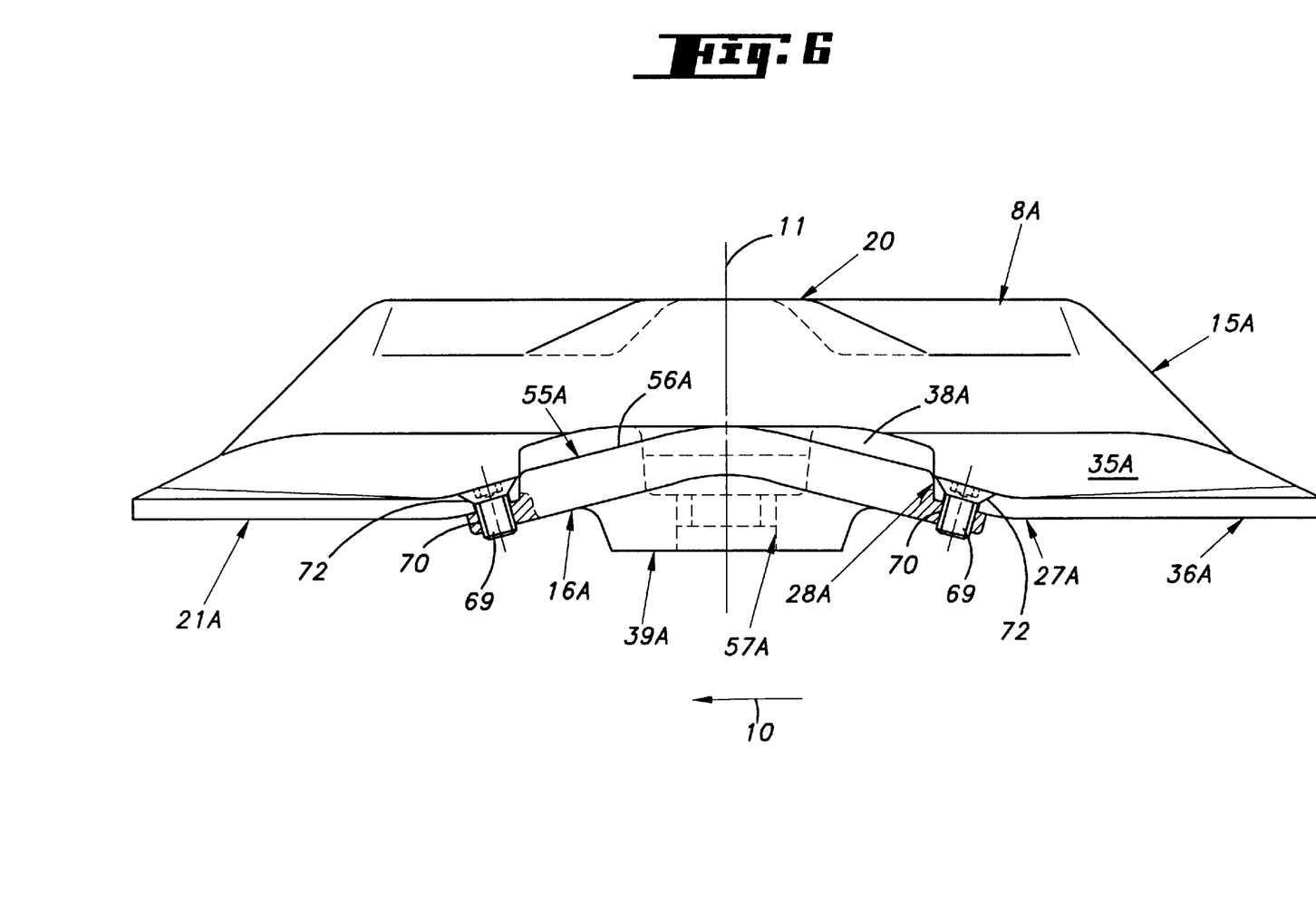
FIG. 6 shows a side view of just a cutting member according to a second embodiment.

FIG. 6 shows a cutting member 8A according to a second embodiment. This member includes a certain number of elements which have been described previously. These elements will consequently keep the same reference number and will not be described again. This member also includes a certain number of elements whose reference number is followed by the letter "A". These elements are comparable to elements of the cutting member 8 and they will be described only if this proves to be necessary.

The second illustrative embodiment of the cutting member 8A, shown in FIG. 6, is overall very similar to the cutting member 8, described previously. It should be noted that the main difference between this cutting member 8A and the cutting member 8, described previously, is the fact that each support 16A, 16'A (only the support 16A being shown) is fastened to the second part 21A of the main structure 15A of the cutting member 8A in a removable manner. For this purpose, it may be seen in FIG. 6 that the support 16A is fastened to the second part 21A by means of several screws 69 which, on the one hand, bear on the upper surface 35A of the second part 21A and, on the other side, are screwed onto the support 16A. To do this, the lower part 39A of the support 16A is slightly greater than the lower part 39 of the support 16 and it extends further below the lower surface 36A of the second part 21A on which it bears. The lower part 39A includes tapped holes 70, into which the corresponding screws 69 are screwed. As regards the second part 21A, this includes holes 72 through which the corresponding screws 69 extend. It will also be noted that the screws 69 are, according to this second illustrative embodiment shown, countersunk head screws 69 and that each hole 72 includes a corresponding conical part. Advantageously, this allows the screws 69 not to project from the upper surface 35A of the second part 21A of the main structure 15A of the cutting member 8A during the fitting operation.

According to this second illustrative embodiment, it may be seen in FIG. 6 that only two screws 69 are shown.

Of course, it is perfectly possible for the support 16A to be able to be fastened to the second part 21A by means of a larger number of screws 69.

The fact that the screws 69 are at least approximately flush with the upper surface 35A makes it possible to prevent premature wear of the screws 69, thereby allowing them to be easily removed in order to replace the support 16A when it is worn.

Finally, various modifications may be made to the examples that have just been described, especially with regard to the construction of the various elements or by the substitution of technical equivalents, without thereby departing from the scope of protection.

Thus, it is perfectly possible, for example, to fasten each support 16, 16'; 16A, 16'A to the second part 21, 21A of the main structure 15, 15A of the cutting member 8, 8A in a removable manner using means other than those described above.

What is claimed as new and desired to be secured by Letters Patent of the United States is:

1. A cutting member of a cutting machine driven in rotation about an upwardly directed axis of revolution, said cutting member comprising:
    cutting elements;
    at least two supports each supporting one of said cutting elements;
    at least two active faces each located in a region of a corresponding one of said cutting elements and each exposed, during a cutting operation, to a product previously cut by said cutting elements to form a cut product, each active face of said at least two active faces contributing to a conveying of said cut product;
    a first part configured to fasten said cutting member to a shaft of longitudinal axis coincident with said upwardly directed axis of revolution; and
    a second part of elongate shape which includes, on a first side, a first end near which a first support of said at least two supports is located and, on a second side, a second end near which a second support is located, wherein each of said first and second supports includes an upper part forming at least a corresponding one of said at least two active faces, said second part including, at first and second ends, an upper surface, said upper part of each of said first and second supports including an upper surface, and said upper surface of said second part lying at a same height as said upper part of each of said first and second supports.

2. The cutting member of a cutting machine as claimed in claim 1, wherein said upper part of each of said first and second supports includes a convex upper surface.

3. The cutting member of a cutting machine as claimed in claim 1, wherein said second part is of oval shape.

4. The cutting member of a cutting machine as claimed in claim 1, wherein said second part includes, on said first side, a first cut located at said first end and, on said second side, a second cut located at said second end, each of said first and second supports being housed in a corresponding one of said first and second cuts.

5. The cutting member of a cutting machine as claimed in claim 1, wherein each of said first and second supports forms a corresponding one of said first and second ends of said second part.

6. The cutting member of a cutting machine as claimed in claim 1, wherein each of said first and second supports has a thickness greater than a thickness of said second part.

7. The cutting member of a cutting machine as claimed in claim 1, wherein each of said first and second supports includes a corresponding lower part which extends below said second part.

8. The cutting member of a cutting machine as claimed in claim 7, wherein said lower part of each of said first and second supports includes a reinforcing lug which extends toward said first part.

9. The cutting member of a cutting machine as claimed in claim 7, wherein said lower part of each of said first and second supports extends beyond outer limits of said upper part of each of said of said first and second supports.

10. The cutting member of a cutting machine as claimed in claim 7, wherein said lower part of each of said first and second supports follows a shape of said second part.

11. The cutting member of a cutting machine as claimed in claim 1, wherein each of said first and second supports forms an attached support which is fastened to said second part by welding.

12. The cutting member of a cutting machine as claimed in claim 1, wherein each of said first and second supports forms an attached support which is fastened to said second part in a removable manner.

13. The cutting member of a cutting machine as claimed in claim 1, wherein each of said first and second supports includes a hole allowing a corresponding one of said cutting elements to be connected thereto.

14. A cutting machine hitched to a motor vehicle and including a cutting mechanism having at least one cutting member, said cutting member comprising:
    cutting elements;
    at least two supports each supporting one of said cutting elements;
    at least two active faces each located in a region of a corresponding one of said cutting elements and each exposed, during a cutting operation, to a product previously cut by said cutting elements to form a cut product, each active face of said at least two active faces contributing to a conveying of said cut product;
    a first part configured to fasten said cutting member to a shaft of longitudinal axis coincident with said upwardly directed axis of revolution; and
    a second part of elongate shape which includes, on a first side, a first end near which a first support of said at least two supports is located and, on a second side, a second end near which a second support is located, wherein each of said first and second supports includes an upper part forming at least a corresponding one of said at least two active faces, said second part including, at first and second ends, an upper surface, said upper part of each of said first and second supports including an upper surface, and said upper surface of said second part lying at a same height as said upper part of each of said first and second supports.

* * * * *